United States Patent
Calås et al.

(10) Patent No.: US 7,712,228 B2
(45) Date of Patent: May 11, 2010

(54) METHOD AND A DEVICE FOR EFFECTING AUTOMATIC CENTERING OF AN ANNULAR WORKPIECE ON A ROTATING SURFACE

(75) Inventors: Peter Calås, Hindås (SE); Jacek Kaminski, Mölnlycke (SE); Håkan Båstedt, Hålta (SE); Stefan Högnäs, Göteborg (SE)

(73) Assignee: Aktiebolaget SKF, Gothenburg (SE)

( * ) Notice: Subject to any disclaimer, the term of this patent is extended or adjusted under 35 U.S.C. 154(b) by 216 days.

(21) Appl. No.: 12/007,033

(22) Filed: Jan. 4, 2008

(65) Prior Publication Data

US 2008/0164663 A1    Jul. 10, 2008

(30) Foreign Application Priority Data

Jan. 5, 2007    (SE) .................................... 0700016
Jan. 19, 2007   (SE) .................................... 0700113

(51) Int. Cl.
*G01D 21/00*    (2006.01)
*B23Q 3/152*    (2006.01)

(52) U.S. Cl. ........................... 33/644; 33/520; 414/776; 414/781; 414/936

(58) Field of Classification Search .................. 33/644, 33/645, 613, 661, 520, 549–553, 568, 569, 33/573; 279/133; 414/936, 771, 774–776, 414/779, 781, 784
See application file for complete search history.

(56) References Cited

U.S. PATENT DOCUMENTS

| | | | | |
|---|---|---|---|---|
| 4,425,076 A | * | 1/1984 | Colineau | .................... 414/781 |
| 4,655,584 A | * | 4/1987 | Tanaka et al. | .................. 355/53 |
| 5,213,348 A | * | 5/1993 | Crossman et al. | ............ 279/126 |
| 5,452,521 A | * | 9/1995 | Niewmierzycki | ............. 33/520 |
| 6,519,861 B1 | * | 2/2003 | Brueck et al. | .................. 33/507 |
| 7,547,181 B2 | * | 6/2009 | Fukatsu et al. | ............... 414/757 |

FOREIGN PATENT DOCUMENTS

DE    102004023789 A1 * 12/2005
JP    10-43985 A    2/1998

OTHER PUBLICATIONS

Machine translation and JP 10-43985A, translation performed Sep. 16, 2009.*

* cited by examiner

*Primary Examiner*—Amy Cohen Johnson
(74) *Attorney, Agent, or Firm*—Buchanan Ingersoll & Rooney PC

(57) ABSTRACT

A method and device for effecting automatic centering of an annular workpiece on a rotating surface having a rotational center involves arbitrarily positioning the workpiece on the slowly rotating surface, applying a support for the workpiece by way of spaced apart contact members that individually contact the workpiece and are synchronously movable in a guided reciprocating manner towards and away from the rotational center of the rotating surface. The contact members are gradually retracted away from the rotational center of the rotating surface until the workpiece is unaffected by the contact members during one revolution of the rotating surface so that the workpiece is centered, and the center of the workpiece coincides with the rotational center of the rotating surface. At least one of the contact members is provided with a mechanism for counteracting a friction force acting on the workpiece.

16 Claims, 3 Drawing Sheets

METHOD AND A DEVICE FOR EFFECTING AUTOMATIC CENTERING OF AN ANNULAR WORKPIECE ON A ROTATING SURFACE

TECHNOLOGICAL FIELD

The present invention generally relates to a method for effecting automatic centering of an annular workpiece on a rotating surface, and also to a device for practicing the method.

BACKGROUND DISCUSSION

When an annular workpiece is to be machined in a mechanical treatment machine, the workpiece is usually clamped on a disk-shaped rotating, magnetic chuck. The mechanical mechanism used for feeding the workpieces onto the chuck, commonly robots, ordinarily have a rather low precision. Thus, the workpiece is often placed in a position where its center does not coincide with the rotational center of the magnetic chuck.

For obtaining a better coincidence between the center of the chuck and the annular workpiece, when this is positioned thereon, it is of course possible to use high precision robots, with intricate sensing and positioning systems. However, this entails quite expensive equipment.

The annular blanks are furthermore seldom perfectly round, but more or less oval, which also makes it difficult to have the ring members positioned so that they can be readily machined when affixed on the rotating magnetic chuck, even when high precision feeding members are used.

JP 10-043985 discloses a centering method incorporating a rotary magnetic chuck with a circular workpiece positioned thereon, and with driving parts arranged to move towards the center of the chuck. Measuring instruments move simultaneously to a centering measuring reference surface and send a signal when the measured value falls within a prescribed range, whereupon the driving parts are returned to their prescribed position. During this time, the measuring instruments continue measurement and when the numeric value does not change, a grinding process is started. This method is referred to as "automatic", but it thus utilizes measuring instruments for controlling and monitoring the centering.

SUMMARY

A method for effecting automatic centering of an annular workpiece on a rotating surface having a rotational center, and also for preventing that the workpiece unintentionally is urged towards the outer edge of the rotating surface due to friction between the workpiece and a member used for applying the force on the workpiece. The method involves arbitrarily positioning the workpiece on the slowly rotating surface, applying a support for the workpiece by way of fingers or contacting members contacting the workpiece in at least two spaced apart positions and having a bisecting mean line extending radially towards the rotational center of the rotating surface, gradually retracting the fingers in the direction of the bisecting mean line until the workpiece is unaffected by the fingers during one revolution of the rotating surface, whereby the workpiece has been centered and the center of the workpiece coincides with the rotational center of the rotating surface, and arranging, at least at one of the spaced apart fingers, means for counteracting a friction force acting on the workpiece in this position, which friction force otherwise would result in a force component acting upon the workpiece for moving it radially outwardly from the center of the rotating surface.

According to one aspect, a method of centering a workpiece involves arbitrarily positioning an annular workpiece on a rotating surface, applying a support to the workpiece with a first contact member and a second contact member that are spaced apart from one another, with both contact members individually contacting the workpiece and being synchronously movable in a guided reciprocating manner towards and away from the rotational center of the rotating surface, and gradually retracting the first and second contact members away from the rotational center of the rotating surface until the workpiece is unaffected by the contact members during one revolution of the rotating surface, whereby the workpiece is centered and the center of the workpiece coincides with the rotational center of the rotating surface. The method also involves arranging, at least at one of the spaced apart contact members, means for counteracting a friction force acting on the workpiece in this position, which friction force otherwise would result in a force component acting upon the workpiece for moving it radially outwardly from the center of the rotating surface.

BRIEF DESCRIPTION OF THE DRAWING FIGURES

Hereinafter, the method and device disclosed here will be described more in detail with reference to embodiments schematically illustrated in the accompanying drawing figures in which like elements are designated by like reference numerals.

FIG. 1 schematically illustrates from above parts of a centering device as disclosed herein during an initial phase of automatic centering of an annular object on a rotating surface.

Figure 6:
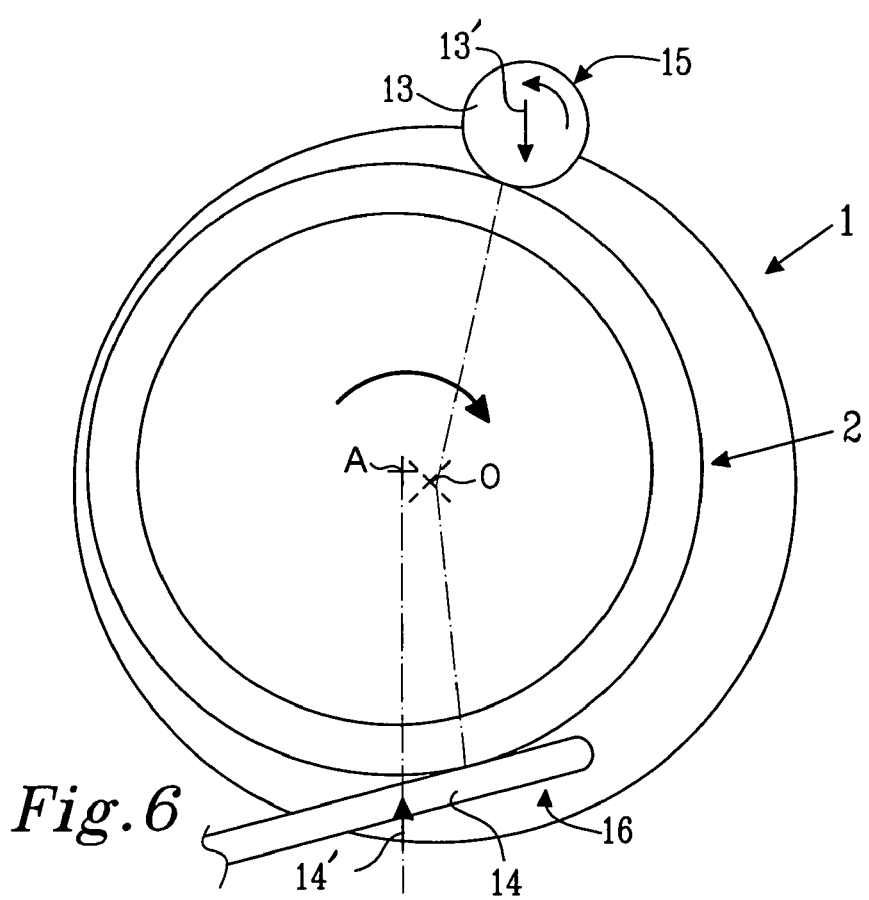

FIG. 6 schematically illustrates from above parts of a device according to another embodiment during an initial phase of automatic centering of an annular object on a rotating surface.

DETAILED DESCRIPTION

Figure 1:
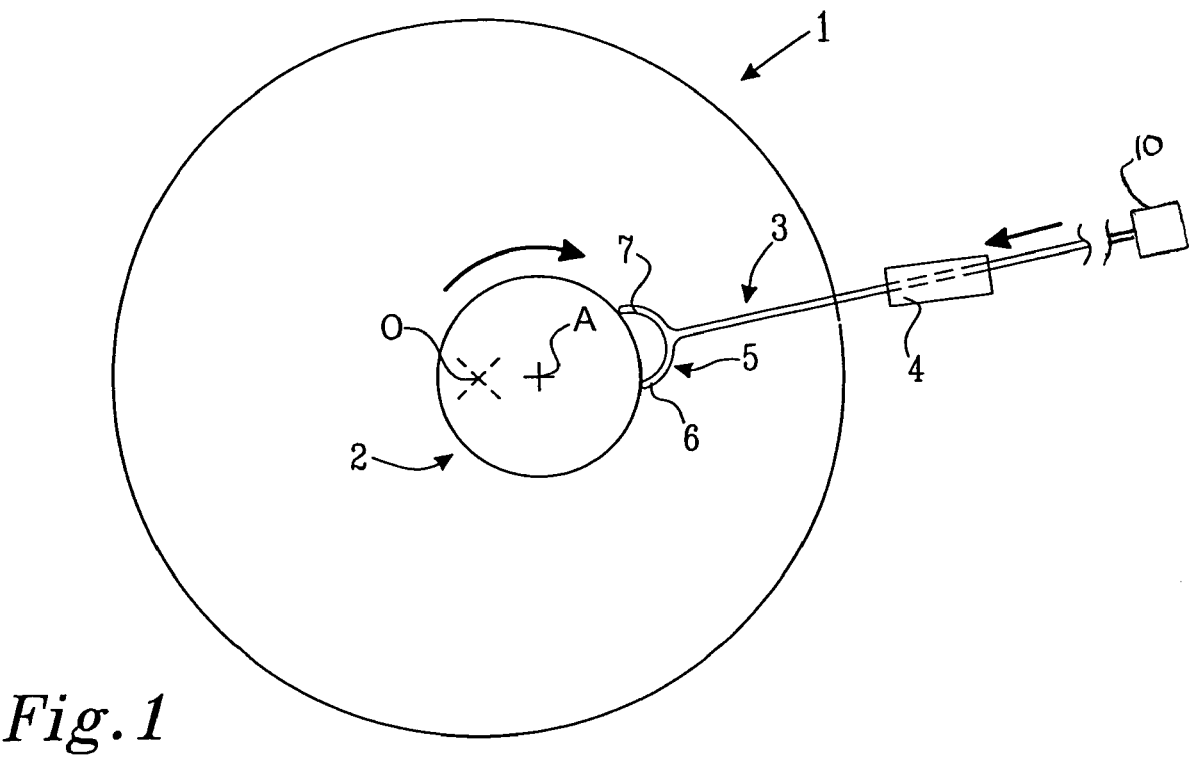

FIG. 1 shows schematically a rotating surface 1, which is arranged to rotate slowly about its rotational center O. This rotating surface 1 is preferably a magnetic chuck of any available type, though it is also possible to use other types of chucking equipment for axial chucking. Positioned (randomly positioned) on this chuck is an annular object or workpiece 2, having a geometrical center A. Due to the arbitrary or random positioning of the object on the chuck, the object is most often offset from the rotational center O of the rotating surface 1. During the automatic centering process, the magnetic force is kept at a relatively low level, thereby allowing the workpiece 2 to be movable on the chuck, when influenced by forces acting parallel (inclusive of substantially parallel) with the plane of the rotating surface 1.

A device 3 is provided to effect centering of the workpiece 2. The device 3 is arranged to be movable radially towards and away from the rotational center O of the rotating surface 1. By way of example, the centering device can be moved radially by way of a reciprocating driving device 10 and by being guided in guides 4. In the schematic illustration according to FIG. 1, this device 3 is shown as a rod having a yoke 5 at one end facing the rotational center O of the rotating surface, and terminating in two spaced apart fingers 6, 7 having a bisecting mean line extending radially towards the rotational center O of the rotating surface 1. When the annular workpiece is randomly positioned on the surface 1, the rotating surface (together with workpiece) is started to rotate slowly. When the workpiece 2 is positioned in relation to the device 3 so that the workpiece is supported by the fingers 6, 7 of the device 3, the fingers 6, 7 are gradually retracted in the direction of the bisecting mean line until the workpiece 2 is no longer affected (is not moved) by the fingers 6, 7 during one revolution (complete revolution) of the rotating surface 1.

In a situation where the workpiece 2 is positioned so that it is not readily in contact with the fingers 6, 7 of the device 3, the device 3 is first advanced radially towards the rotational center O of the rotating surface 1, and when any one of the two fingers 6, 7 of the yoke 5 of the pushing device 3, during its advancing motion, reaches the outer peripheral surface of the workpiece 2, a tilting will occur so that both fingers 6, 7 will contact the outer peripheral surface of the workpiece at spaced apart positions, thereby subjecting the workpiece to two spaced apart forces, both acting in a direction towards the slowly rotating surface 1.

Figure 2:
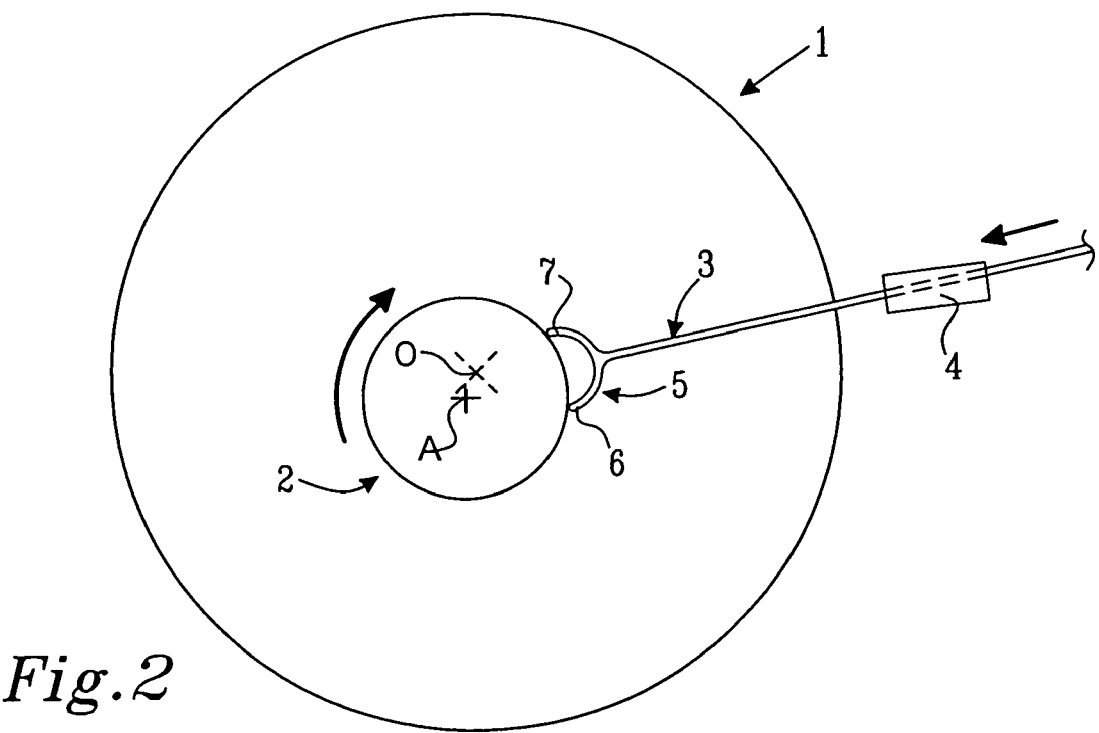
FIG. 2 is a schematic illustration similar to FIG. 1 illustrating a second phase of automatic centering of the annular object.

This advance motion of the device 3, which is here acting for pushing the workpiece 2, is maintained until the workpiece 2 has been pushed so far that its center A has been passed over and reached just beyond the rotational center O of the rotating surface 1, such as illustrated in FIG. 2.

Figure 3:
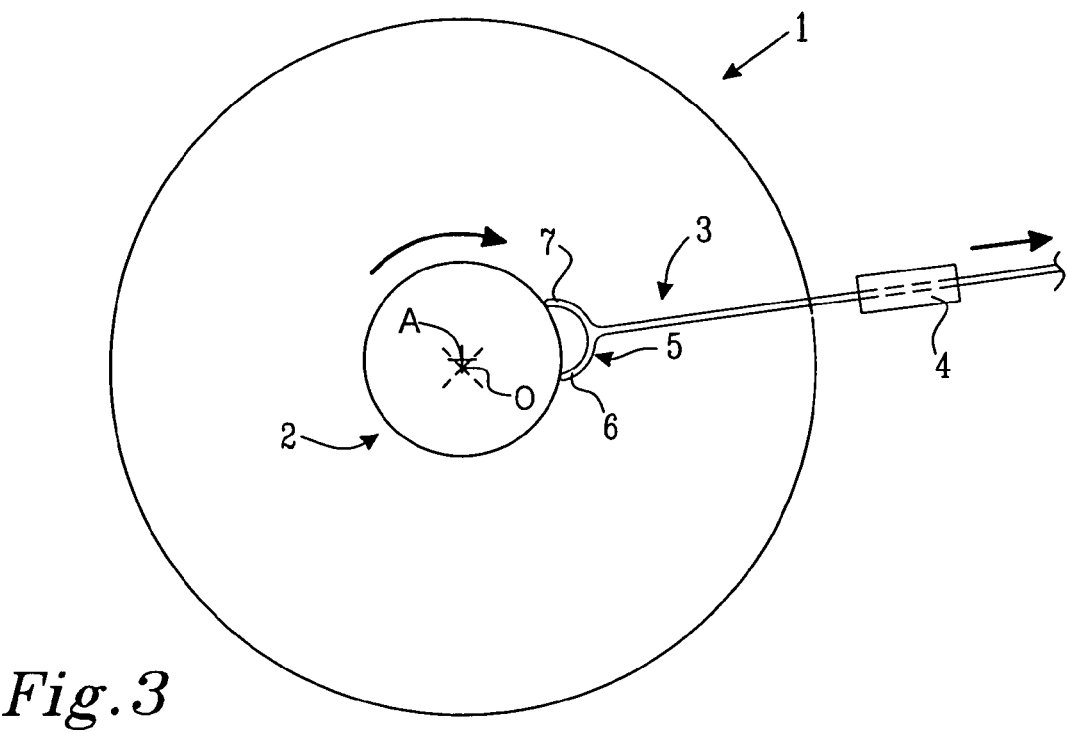
FIG. 3 is another schematic illustration during a third phase of automatic centering of the annular object.

When this position is reached, the advance motion of the pushing device is stopped, and the pushing device 3 is slowly retracted, as illustrated in FIG. 3. When the rotating surface 1 continues its slow rotation and has made a 180° rotation as compared to the position shown in FIGS. 1 and 2, the workpiece 2 will now be pushed back towards the center O of the rotating surface 1, by actuation of the slowly retracting device 3, which is now acting for supporting the workpiece by way of its two spaced apart fingers 6, 7. The 180° motion made by the rotating surface 1 between the position shown in FIGS. 1 and 2 and that in FIG. 3 can be seen when comparing the short line situated at the lower end of the surface in FIGS. 1 and 2, and at the upper end thereof in FIG. 3.

Figure 4:
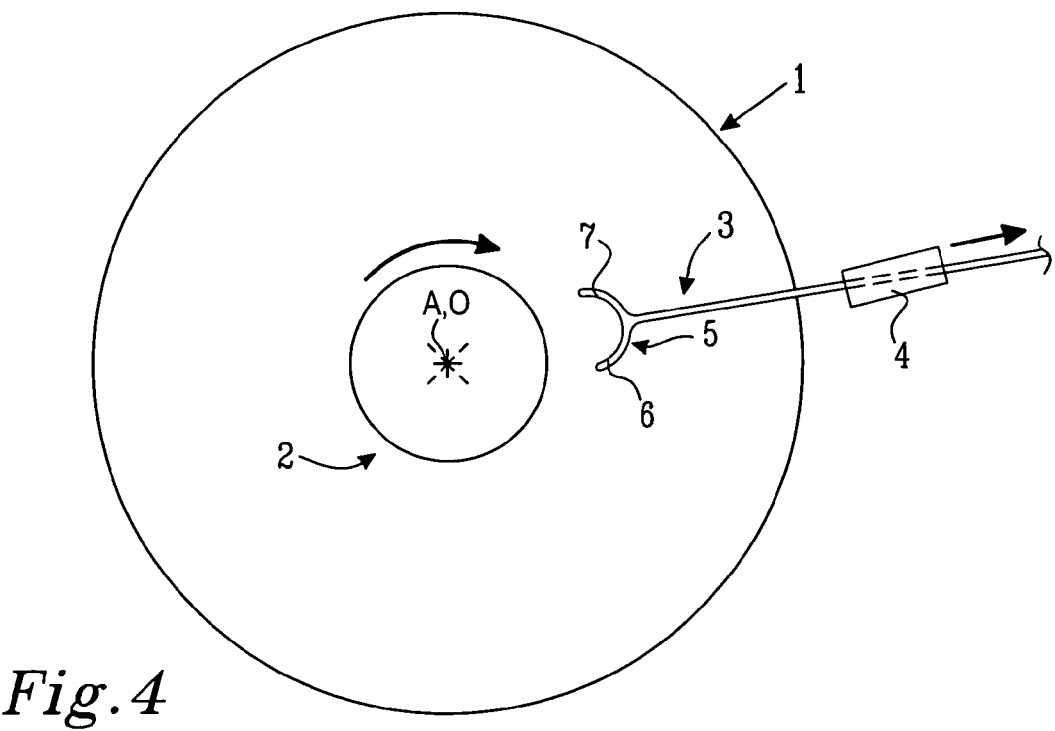
FIG. 4 is another schematic illustration after termination of automatic centering with the annular object being accurately centered about the rotational center of the rotating surface.

When the workpiece 2 has been centered so that its geometrical center A coincides with the rotational center O of the rotating surface 1, as illustrated in FIG. 4, and the pushing device 3 continues to back off or be retracted, the fingers 6, 7 of the pushing device will no longer be in contact with the surface of the workpiece, which therefore will remain in its centered position. In this position the retaining force of the magnetic chuck can be switched over to a strong holding force, whereupon the workpiece can be subjected to a machining operation, such as grinding or turning.

In such a manner it is possible to achieve an exact centering of the annular object, without the need doe using measuring instruments and/or calculating means.

Figure 5:
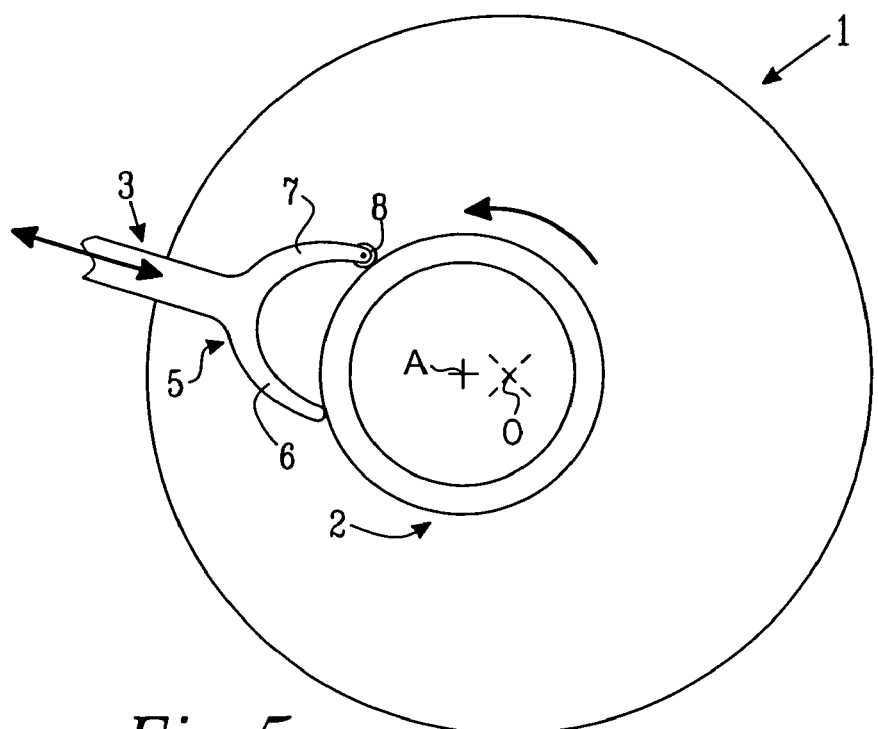
FIG. 5 is an enlarged and slightly more detailed view from above of the device during automatic centering.

FIG. 5 shows a more detailed view of the rotating surface 1, which is rotatable about its center O. A ring member or a workpiece 2 is randomly positioned on the rotating surface 1 and therefore the center A of the workpiece 2 is most probably offset from the rotational center O of the rotating surface 1. The workpiece 2 will thus make a wobbling motion when the rotating surface 1 rotates about its center O. A pushing or supporting device 3 formed as a push rod and having, at its end facing the center of the rotating surface 1, a yoke-formed end 5 with two spaced apart fingers 6, 7, is movable in a guided manner radially towards and away from the rotational center O of the rotating surface 1. The function of the pushing device 3 is the same as described in connection with FIGS. 1-4.

When the annular workpiece is still not centered and therefore is wobbling, in the embodiment illustrated in FIG. 5, the pushing device 3 or supporting device during its movement will first hit the workpiece with the finger 7. At the first contact, the workpiece might receive a force component urging spinning of the annular workpiece outwards due to friction and the angle under which the finger hits the peripheral surface of the workpiece.

To help avoid the workpiece being subjected to such undesirable forces, which could impair the centering function, at least the finger expected to first come in contact with the workpiece should be designed to have as low friction as possible. For effecting this, as illustrated in FIG. 5, the end of the finger could be provided with a rotating wheel 8 or a disk, a traveling belt or the like, which should be driven to rotate in a direction giving a friction force component between the finger 7 and the workpiece 2 acting to maintain the workpiece in contact with the fingers 6, 7.

If the diameter of the annular workpiece to be centered is relatively large, it is preferable that the distance between the ends of the contact members is also large, and so the pushing device would tend to be very large, and thereby occupy a very large space in connection to the rotating surface. Thus the solution encompassed by the embodiment according to FIGS. 1 to 5 is less suited for automatic centering of very large annular workpieces.

In FIG. 6 is schematically shown a rotating surface 1 arranged to rotate slowly about its rotational center O. This rotating surface 1 is preferably a magnetic chuck of any available type, though it is also possible to use other types of chucking equipment for axial chucking. On this chuck is randomly positioned an annular object or workpiece 2, having a geometrical center A, which, due to the arbitrary or random positioning of the object, most often is offset from the rotational center O of the rotating surface 1. During the automatic centering process, the magnetic force is kept at a low level, thereby allowing the workpiece 2 to be movable on the chuck, when influenced by forces acting substantially parallel with the plane of the rotating surface 1.

For effecting centering of the workpiece 2, a first contact member 13 is arranged to be movable towards and away from the rotational center O of the rotating surface 1, e.g., by way of a reciprocating driving device (which may be similar to that schematically shown in FIG. 1) and by being guided in guides, for contacting the outer peripheral surface of the annular workpiece 2.

The first contact member 13 thus is arranged to be movable in the direction shown by the straight arrow 13', and it is preferably, though not necessarily, connected to and operable by a machining slide system or a separate slide system in a machine tool, in which the rotating surface 1 forms a chuck for the workpiece 2.

Such a machine tool is preferably a 2+2 axis CNC machine, though is not limited in that regard as other tools may be used.

The device also incorporates a second contact member 14 arranged to contact the outer peripheral surface of the annular workpiece 2 at a position well spaced apart from the contact position of the first contact member 13 and the workpiece. This second contact member 14 is also movable in a reciprocating manner, and in the direction shown by the straight arrow 14'. This second contact member 14 is preferably, though not necessarily, connected to and operable by another machining slide system in the machine tool, in which the rotating surface 1 forms a chuck for the workpiece 2. Alternatively the contact members can be connected to and operable by a separate slide system.

When the annular workpiece has been randomly positioned on the surface 1, the surface (together with the workpiece) is started to rotate slowly, and in the situation where the workpiece 2 has been positioned in relation to the contact members 13, 14 so that it is supported by the contact members, the contact members are gradually retracted radially until the workpiece 2 is unaffected (not moved) by the contact members 13, 14 during one revolution (complete revolution) of the rotating surface 1.

In a situation where the workpiece 2 has been positioned so that it is not readily in contact with the contact members 13, 14, the contact members 13, 14 are first advanced synchronously in opposite directions towards the rotational center O of the rotating surface 1. When any one of the two contact members 13, 14, during its advancing motion, reaches the outer peripheral surface of the workpiece 2, this will move so that both contact members 13, 14 contact the outer peripheral surface of the workpiece at spaced apart positions, thereby subjecting the workpiece to two spaced apart forces, both acting in a direction towards the rotational center O of the slowly rotating surface 1.

This advance motion of the contact members 13, 14, which are here acting for pushing the workpiece 2, is maintained until the workpiece 2 has been pushed so far that its center A has passed over and reached just beyond the rotational center O of the rotating surface 1.

When this position has been reached the advance motion of the contact members 13, 14 is stopped, and the contact members 13, 14 are slowly retracted. When the rotating surface 1 continues its slow rotation, the workpiece 2 will now be pushed back towards the center O of the rotating surface 1, by actuation of the slowly retracting contact members 13, 14, which are now acting for supporting the workpiece by way of the two spaced apart contact positions.

When the workpiece 2 has been centered so that its geometrical center A coincides with the rotational center O of the rotating surface 1, and the contact members 3, 4 continue to back off or be retracted, the contact members 13, 14 will no longer be in contact with the surface of the workpiece, which therefore will remain in its centered position. In this position the retaining force of the magnetic chuck can be switched over to a strong holding force, whereupon the workpiece can be subjected to a machining operation, such as grinding or turning.

In such a manner it is possible to achieve a substantially exact centering of the annular object, without the need for using measuring instruments and/or calculating means.

When the annular workpiece is still not centered and therefore is wobbling, the contact member 13, which during its movement will first hit the outer peripheral surface of the workpiece, at the first contact with the workpiece might give the workpiece a force component urging the annular workpiece to spin outwards due to friction and depending on the angle under which the contact member hits the peripheral surface of the workpiece.

In order to help avoid the workpiece being subjected to such undesirable forces, which could impair the centering function, at least the contact member 13 expected first to come in contact with the workpiece should be designed to have such a friction that the resulting friction force can push the ring towards the center of the rotating surface. For effecting this, the contact member 13 can be provided with a rotating wheel 15 or a disk, which should be driven to rotate in a direction giving or imparting a friction force component between the wheel 15 and the workpiece 2, acting to maintain the workpiece in contact with the wheel 15 of the contact member 13. The second contact member 14 might also be provided with an implement such a freely rotating wheel or a traveling belt 16, which even could be driven.

The principles, embodiments and operational aspects of the device and method disclosed here have been described in the foregoing specification, but the invention which is intended to be protected is not to be construed as limited to the particular embodiments disclosed. The embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A method for effecting automatic centering of an annular workpiece on a surface having a rotational center, comprising:

arbitrarily positioning an annular workpiece on a rotating surface, the annular workpiece possessing a center;

applying a support to the workpiece by contacting the workpiece with a first contact member and a second contact member that are spaced apart from one another and that are reciprocatingly movable towards and away from a rotational center of the rotating surface, wherein at least one of the first and second contact members comprises a driven rotary element;

gradually retracting the first and second contact members away from the rotational center of the rotating surface until the workpiece is unaffected by the contact members during one revolution of the rotating surface, whereby the workpiece is centered so that the center of the workpiece coincides with the rotational center of the rotating surface; and driving the rotary element in a direction and at a speed for counteracting a friction force acting on the workpiece, which friction force otherwise would result in a force component acting upon the workpiece urging the workpiece to move radially outwardly from the rotational center of the rotating surface.

2. The method as claimed in claim 1, wherein the first and second contact members comprise respective fingers contacting an outer peripheral surface of the workpiece in at least two spaced apart positions, the fingers possessing a bisecting mean line extending radially towards the rotational center of the rotating surface, the gradual retraction of the first and second contact members comprising gradually retracting the fingers in a direction of the bisecting mean line until a position of the workpiece is not changed by the fingers during one revolution of the rotating surface, the counteracting of the friction force being performed by at least one of the fingers being provided with means for counteracting the friction force acting on the workpiece.

3. The method as claimed in claim 1, wherein the contact of the workpiece by the first contact member and the second contact member comprises contacting an outer peripheral surface of the workpiece with the first and second contact members that individually contact the workpiece and are individually but synchronously moved in a guided reciprocating manner towards and away from each other and towards and away from the rotational center of the rotating surface, the counteracting of the friction force being performed by at least one of the fingers being provided with means for counteracting the friction force acting on the workpiece.

4. The method as claimed in claim 1, further comprising, following the arbitrary positioning of the annular workpiece on the rotating surface and the applying of the support to the workpiece, and before the gradual retraction of the first and second contact members and the counteracting of the friction force:
pushing the workpiece towards the rotational center of the rotating surface so far that the center of the workpiece passes the rotational center of the rotating surface, the pushing being performed by the first and second contact members.

5. The method as claimed in claim 1, wherein the first and second contact member are spaced apart fingers of a yoke supported on an end of a guided and movable rod.

6. The method as claimed in claim 1, wherein both the first and second contact members comprise driven wheels or belts.

7. The method as claimed in claim 6, wherein the wheels or belts are driven in opposite rotational directions.

8. A device for effecting automatic centering of an annular workpiece, comprising:
a rotatable surface adapted to receive the annular workpiece and configured to be rotated about a rotational center;
first and second reciprocatingly movable contact members configured to be reciprocatingly moved towards and away from the rotational center of the rotatable surface;
the two contact members being spaced apart from one another and arranged together to contact an outer peripheral surface of the annular workpiece to support the workpiece and alternatively pushing the workpiece toward and beyond the rotational center of the rotatable surface at advance movement of the first and second contact members, the first and second contact members being gradually movable radially outwardly away from the rotational center of the rotatable surface, wherein at least one of the fingers comprises a driven rotary element driven in a direction and at a speed for counteracting friction forces acting between the annular workpiece and the rotary element upon contact of the rotary element with the workpiece.

9. The device as claimed in claim 8, wherein the first and second contact members are respective fingers spaced apart from one another.

10. The device as claimed in claim 9, wherein both fingers are provided with individually driven rotary members.

11. The device as claimed in claim 8, wherein the rotating surface is a magnetic chuck, and the device positions the annular workpiece in an accurately centered position on the chuck prior to a mechanical treatment of the workpiece.

12. A device for effecting automatic centering of an annular workpiece, comprising:
a rotatable surface adapted to receive the annular workpiece and configured to be rotated about a rotational center;
a first contact member configured to be reciprocatingly movable toward and away from the rotational center of the rotating surface for supporting and/or pushing the workpiece;
a second contact member configured to be reciprocatingly movable toward and away from the rotational center of the rotating surface for supporting and/or pushing the workpiece;
the first and second contact members being arranged to contact the outer peripheral surface of the annular workpiece at two spaced apart positions for supporting the workpiece alternatively pushing the workpiece toward and beyond the rotational center of the rotating surface upon advance movement of the first and second contact members, and to be gradually moved outwardly upon return movement of the contact members, wherein at least one of the fingers comprises a driven rotary element driven in a direction and at a speed for counteracting friction forces acting between the annular workpiece and the rotary element upon contact of the rotary element with the workpiece.

13. The device as claimed in claim 12, wherein the rotary element comprises a rotationally driven wheel or a driven belt.

14. The device as claimed in claim 12, wherein both the first and second contact members are provided with rotary elements.

15. The device as claimed in claim 12, wherein the rotating surface is a magnetic chuck, and the device positions the annular workpiece in an accurately centered position on the chuck prior to a mechanical treatment of the workpiece.

16. The device as claimed in claim 12, wherein the first and second contact members are connected to and operated by a machining slide system or a separate slide system in a machine tool.

* * * * *